(12) United States Patent
Bounds

(10) Patent No.: US 6,372,137 B1
(45) Date of Patent: Apr. 16, 2002

(54) WASTEWATER TREATMENT SYSTEM FOR MAXIMIZING EFFLUENT QUALITY

(75) Inventor: Terry R. Bounds, Roseburg, OR (US)

(73) Assignee: Orenco Systems, Inc., Sutherlin, OR (US)

( * ) Notice: Subject to any disclaimer, the term of this patent is extended or adjusted under 35 U.S.C. 154(b) by 0 days.

(21) Appl. No.: 09/520,126

(22) Filed: Mar. 6, 2000

(51) Int. Cl.[7] .............................. C02F 3/02; C02F 3/30
(52) U.S. Cl. ..................... 210/605; 210/617; 210/622
(58) Field of Search .............................. 210/605, 615, 210/616, 617, 622

(56) References Cited

U.S. PATENT DOCUMENTS

| | | | |
|---|---|---|---|
| 2,441,813 A | 5/1948 | Halvorson | |
| 2,772,235 A | 11/1956 | Bookout et al. | |
| 3,567,629 A | 3/1971 | Ayers et al. | |
| 3,662,890 A | 5/1972 | Grimshaw | |
| 3,666,106 A | 5/1972 | Green | |
| 3,713,543 A | 1/1973 | Heaney | |
| 4,046,161 A | 9/1977 | Bonneau | |
| 4,070,175 A | * 1/1978 | Swanson et al. | 210/784 |
| 4,156,297 A | 5/1979 | Pilolla | |
| 4,251,359 A | 2/1981 | Colwell et al. | |
| 4,279,753 A | 7/1981 | Nielson et al. | |
| 4,439,323 A | 3/1984 | Ball | |
| 4,492,253 A | 1/1985 | Raftis | |
| 4,689,153 A | 8/1987 | Follmann et al. | |
| 4,784,771 A | 11/1988 | Wathen et al. | |
| 4,818,384 A | 4/1989 | Mayer | |
| 4,895,645 A | 1/1990 | Zorich, Jr. | |
| 5,269,911 A | 12/1993 | Stegall, Sr. et al. | |
| 5,282,972 A | 2/1994 | Hanna et al. | |
| 5,288,407 A | 2/1994 | Bodwell et al. | |
| 5,480,561 A | 1/1996 | Ball et al. | |
| 5,531,894 A | 7/1996 | Ball et al. | |
| 5,653,255 A | 8/1997 | Platz | |

FOREIGN PATENT DOCUMENTS

DE          2 327 111          12/1974

OTHER PUBLICATIONS

Enhanced Nitrogen Removal Using a Modified Recirculating Sand Filter by Sandy, Sack & Dix, from the 5th ASAE Conference Dec. 14–15, 1987 (pp. 161–170).
Efofinn Bioclere™ brochure on Self-Contained Wastewater Treatment Plants, copyrighted 1986, pp. 1–4.
Efofinn Bioclere brochure for Bioclere Systems., published Nov. 17, 1994 (4 pages).
The Bioclere Process (Typical Bioclere System), published Nov. 17, 1994 (2 pages).
Bounds, T.R., Design and Performance of Septic Tanks, (1997).

* cited by examiner

Primary Examiner—Chester T. Barry
(74) Attorney, Agent, or Firm—Chernoff, Vilhauer, McClung & Stenzel

(57) ABSTRACT

A wastewater treatment system comprises a septic tank which flows substantially all of its liquid effluent through an aerobic filter having a filter medium to produce a nitrified filtrate of reduced biological oxygen demand (BOD) and total suspended solids (TSS). The majority of the filtrate is returned to the septic tank for denitrification followed by further recirculation through the aerobic filter. All permanent discharge of effluent from the system is in the form of filtrate from an aerobic filter. Permanent discharge of effluent directly from the septic tank is prevented.

10 Claims, 7 Drawing Sheets

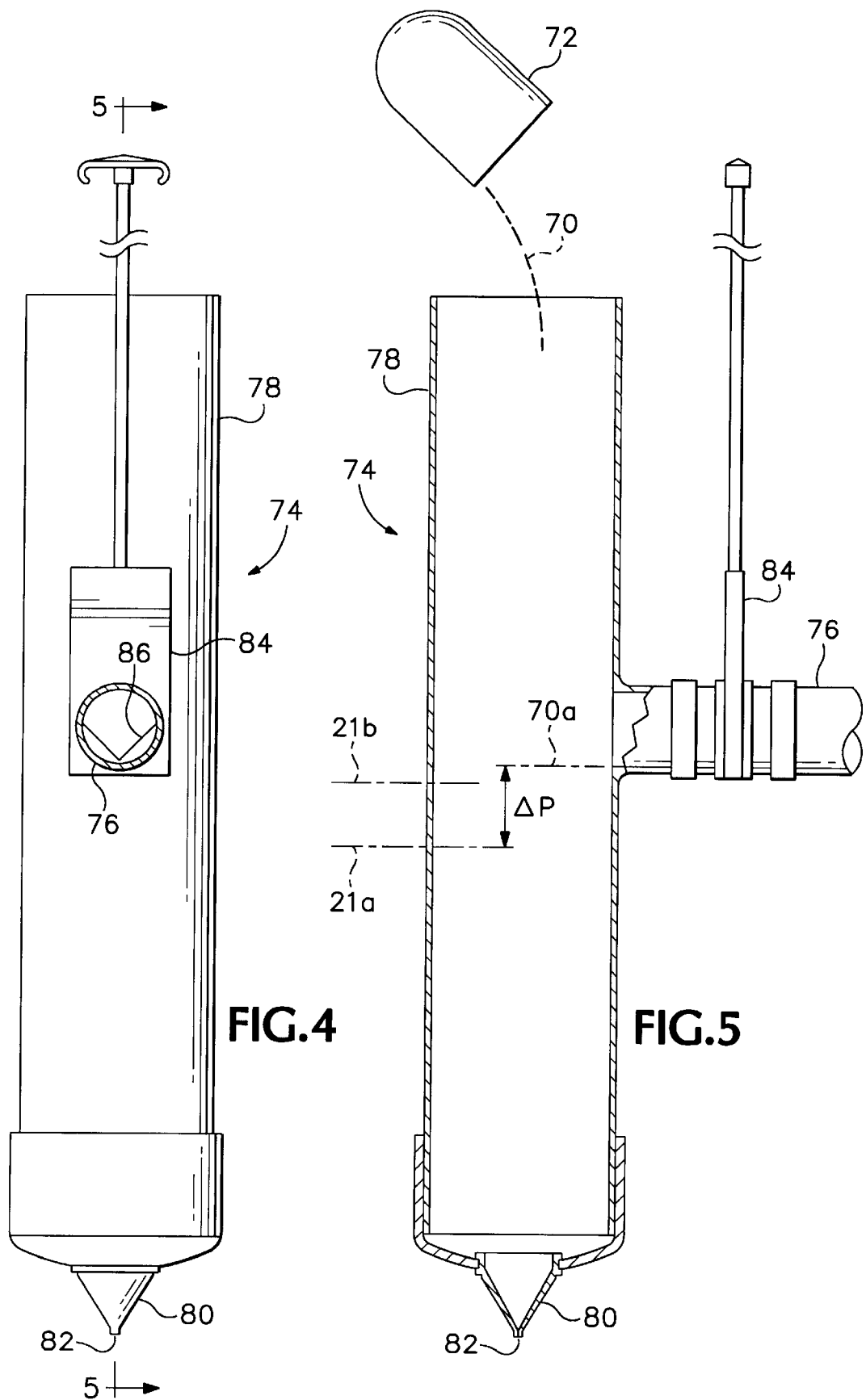

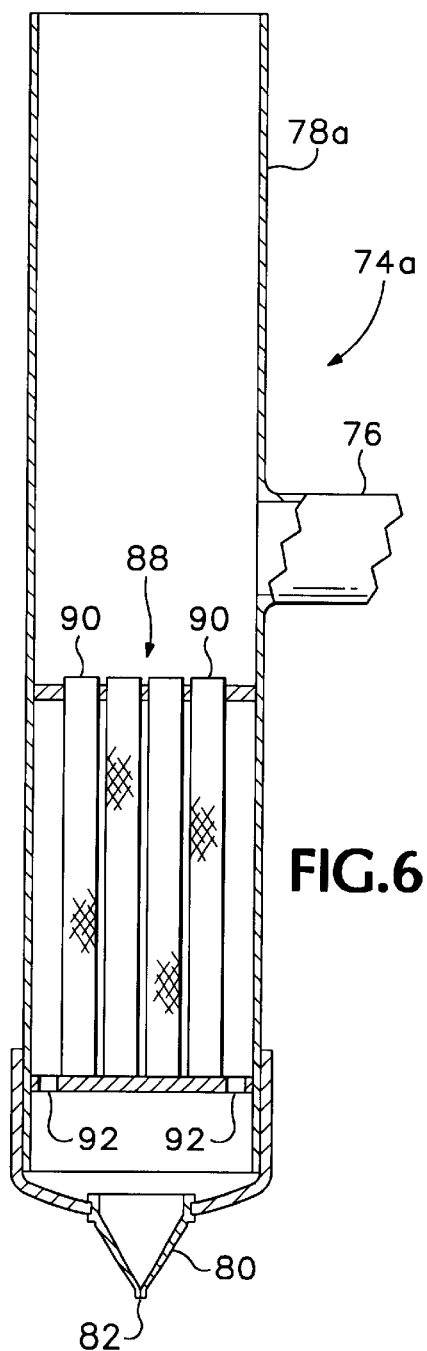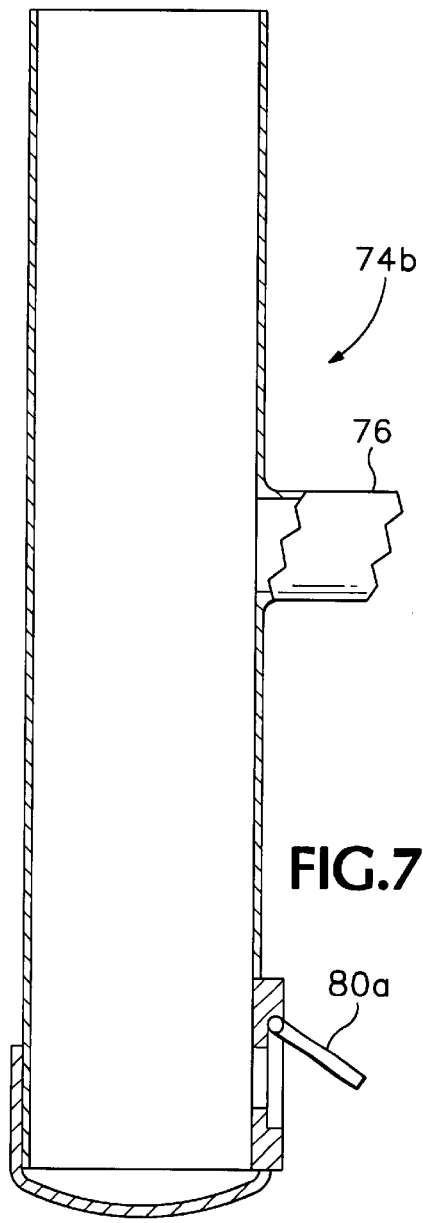

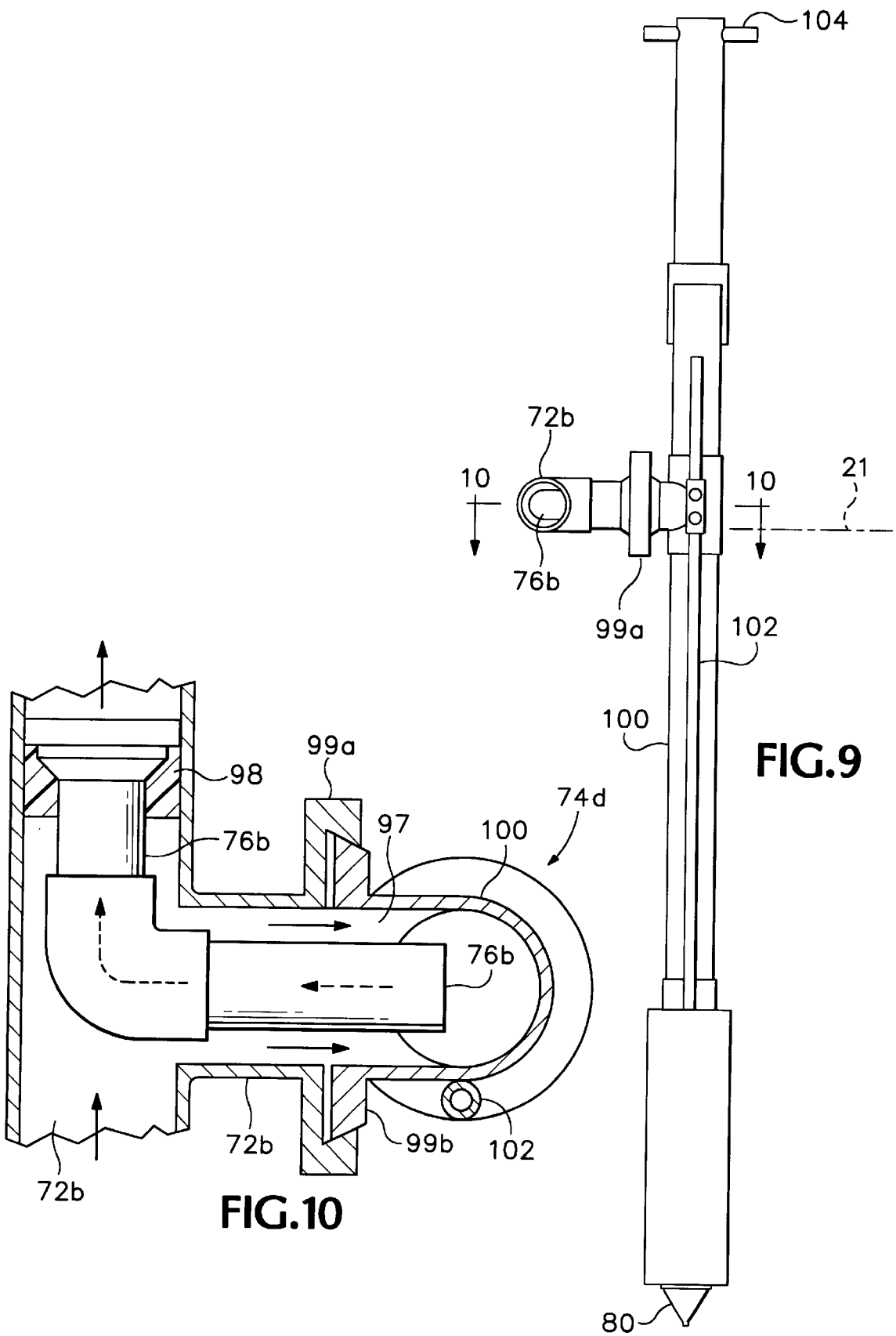

WASTEWATER TREATMENT SYSTEM FOR MAXIMIZING EFFLUENT QUALITY

BACKGROUND OF THE INVENTION

The present invention is directed to a sewage wastewater treatment system comprising a septic tank and aerobic filter arranged in a manner which maximizes the quality of the effluent permanently discharged from the system.

A septic tank typically provides primary treatment for domestic wastewater where municipal treatment facilities are unavailable. In a conventionally operated septic tank, raw untreated sewage wastewater having a significant concentration of waste solids is introduced into the tank from an adjacent building. In the septic tank, solids separate from the liquid portion of the sewage. Solids having a lower density than the liquid move to the top of the liquid to form a scum layer, and solids having a higher density than the liquid sink to the bottom of the tank to form a sludge layer, resulting in a relatively clear liquid layer between the scum and the sludge. This liquid portion of the wastewater, which exits the discharge end of the tank by means of gravity, a pump, or a siphon, is the septic tank effluent.

The quality of the septic tank effluent primarily determines its subsequent disposition, including the size and kind of any required secondary waste treatment facilities. Such effluent quality is generally measured by the biochemical oxygen demand (BOD), total suspended solids (TSS), and total nitrogen present in the effluent.

Nitrogen in raw untreated wastewater is primarily organic nitrogen combined in proteinaceous material and urea. Decomposition of the organic material by bacteria present in the anaerobic environment of the septic tank changes the organic nitrogen to ammonia nitrogen. Thus, in conventionally treated septic tank effluent, nitrogen is present primarily as ammonia nitrogen.

Secondary treatment of septic tank effluent is typically an aerobic treatment. In addition to its reduction of BOD and TSS, the aerobic environment of secondary treatment causes bacteria to oxidize ammonia nitrogen to nitrate nitrogen, a process known as nitrification. Thus, in a conventional system, nitrogen in the secondary treatment effluent is primarily nitrate nitrogen. The secondary treatment effluent is either discharged directly from the system, or undergoes at least partial recirculation through a recirculation tank as shown in U.S. Pat. No. 5,480,561. However, the nitrogen content of the secondary treatment effluent is often unacceptable.

In order to reduce the nitrogen content of the secondary treatment effluent, the nitrate nitrogen must be converted to a readily removable gaseous form of nitrogen. As disclosed in U.S. Pat. No. 5,531,894, this conversion can be accomplished biologically under anaerobic conditions by denitrifying bacteria. Denitrifying bacteria are capable of converting nitrate to nitrite, followed by production of nitrogen gas ($N_2$) which is released to the atmosphere and thus removed entirely from the effluent. To accomplish such removal, however, the denitrifying bacteria require a source of carbon for cell synthesis. Conventional nitrate-laden secondary treatment effluent does not contain a sufficient source of carbon for the denitrifying bacteria, since the aerobic process which produces the secondary treatment effluent removes carbon sources by reducing the BOD. Nor does a recirculation tank such as that shown in the aforementioned U.S. Pat. No. 5,480,561 supply sufficient carbon. However, as disclosed in U.S. Pat. No. 5,531,894, an actual septic tank which receives raw untreated sewage wastewater does supply sufficient carbon to provide significant nitrogen removal by denitrification.

Nonetheless, the system shown in U.S. Pat. No. 5,531,894 fails to maximize the overall quality of the effluent permanently discharged from the system. This is because the system permanently discharges its effluent directly from a septic tank compartment, which necessarily means that the effluent is a mixture of some denitrified secondarily treated effluent and some primarily treated effluent which has not yet undergone the nitrification or the reduction in BOD and TSS accomplished by secondary treatment in an aerobic filter.

BRIEF SUMMARY OF THE INVENTION

Accordingly, it is one object of the present invention to maximize the quality of septic tank effluent with respect to its BOD, TSS and total nitrogen levels by arranging a septic tank and an aerobic filter in a novel recirculating treatment assembly which provides denitrification but prevents permanent discharge from the treatment assembly of any liquid other than as a filtrate from the aerobic filter.

It is a separate object of the present invention, independent of the previous object, to provide a novel filtrate flow splitter capable of recirculating part of the filtrate through a tank and permanently discharging the remainder while preventing permanent discharge of liquid directly from the tank.

It is a further separate object, independent of the previous objects, to provide denitrification in a meander-type septic tank.

BRIEF DESCRIPTION OF THE SEVERAL VIEWS OF THE DRAWINGS

FIG. 4 is an enlarged view of an exemplary filtrate flow splitter, taken along line 4—4 of FIG. 2.

FIG. 5 is a partially sectional view taken along line 5—5 of FIG. 4.

FIG. 6 is a partially sectional view of an alternative embodiment of a flow splitter.

FIG. 7 is a partially sectional view of a further alternative embodiment of a flow splitter.

FIG. 9 is a side view of a still further alternative embodiment of a flow splitter.

FIG. 10 is a sectional view taken along line 10—10 of FIG. 9.

DETAILED DESCRIPTION OF THE PREFERRED EMBODIMENT

Figure 1:
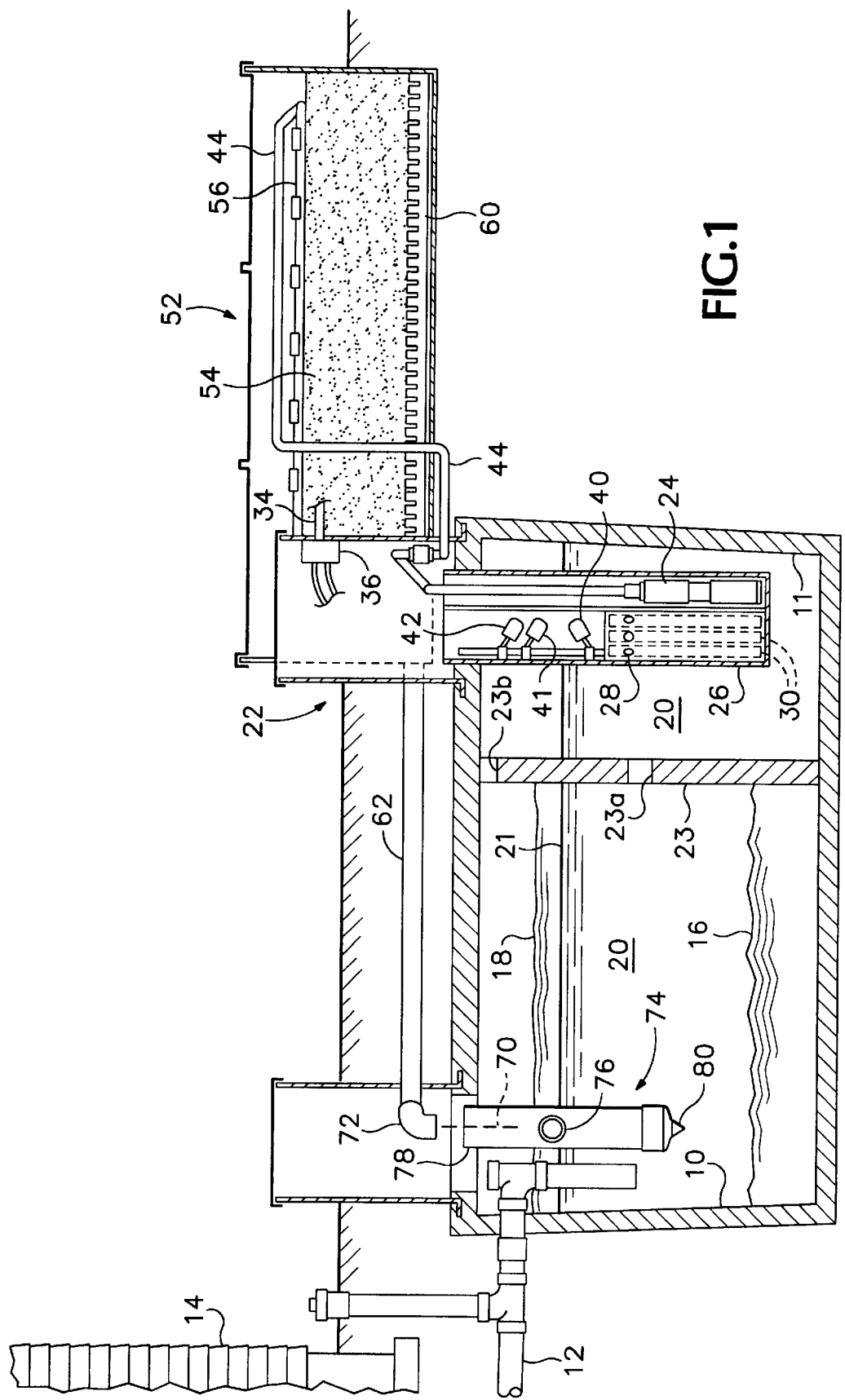
FIG. 1 is a sectional side view of an exemplary embodiment of a system in accordance with the present invention.

In the exemplary embodiment of the invention shown in FIG. 1, a septic tank 10 receives untreated, raw sewage wastewater, having a significant concentration of waste solids, through an inlet 12 directly from a residence or other building 14. The septic tank may be made of a suitable material such as fiberglass or concrete. In the septic tank, gravity operates to divide the wastewater into three layers. The solids separate from the wastewater and distribute into a lower horizontal sludge layer 16 and an upper horizontal scum layer 18 with a relatively clear central horizontal liquid layer 20 therebetween having an upper surface 21. Meanwhile, anaerobic bacteria convert the organic nitrogen in the wastewater to ammonia nitrogen. The liquid layer 20 continually communicates between the septic tank 10 and a recirculation tank 11 through an aperture 23a formed in a dividing partition 23 which also has an air vent 23b. Alternatively, the partition 23 could be eliminated so that the entire tank is a septic tank, with no recirculation tank 11.

A pump assembly, indicated generally as 22, includes an electric effluent pump 24 preferably located in a cylindrical housing 26 having an encircling horizontal row of apertures 28 exposed to the liquid layer 20. Within the housing 26 is a group of tubular filters 30 which filter solids from the liquid entering the housing 26 through the apertures 28, as described in more detail in U.S. Pat. No. 5,492,635 which is hereby incorporated by reference. Other types of pump assemblies, with or without accompanying housings or filters, could be employed in place of the pump 24 and housing 26. Alternatively, gravity or siphon outlet systems, with or without housings or filters, could be employed.

A control panel (not shown) controls the operation of the effluent pump 24 through an electrical conduit 34 connected to a splice box 36. The pump 24 is activated intermittently in response to a conventional float switch assembly which includes a redundant off/low level alarm float 40, a timer override on/off float 41, and a timer override on/alarm float 42. When activated, the pump 24 pumps the ammonia-laden liquid 20 through a tank outlet 44 to an aerobic filter 52. If desired, the tank outlet 44 can include one or more intervening liquid-containing tank or chambers (not shown).

The aerobic filter 52 is preferably an attached growth treatment system containing a filter media 54 having one or more preferably textile layers suitable for the support and growth of an ecosystem of microorganisms, including nitrifying bacteria, capable of performing substantial organic and inorganic process reductions. Aerobic filters of this type are shown in the systems described in U.S. Pat. Nos. 5,531,894 and 5,480,561, which are hereby incorporated by reference. A distribution manifold 56 receives the liquid 20 from the tank outlet 44 and distributes it through the filter media 54. The filter media 54 is kept constantly in an aerated condition by an air intake fan (not shown) so as to support the aerobic microorganisms which degrade or oxidize the organic material present in the liquid and thereby reduce the BOD and TSS. Meanwhile, the nitrifying bacteria convert the ammonia nitrogen present in the liquid to nitrate nitrogen. The liquid passes through the filter media to the slotted underdrain 60 which collects the nitrate-laden filtrate and conducts it through a filtrate outlet conduit 62 to a filtrate inlet 72 of the septic tank 10.

Depending upon the height of the upper surface 21 of the liquid layer 20 within the septic tank, a portion of the filtrate is returned to the septic tank from the filtrate inlet 72 in a manner to be described hereafter. In the septic tank, heterotrophic bacteria under anoxic conditions convert the nitrate nitrogen in the filtrate to gaseous nitrogen products (a process called denitrification) which permanently separate from the blended filtrate and raw wastewater and are released to the atmosphere. The organic matter present in the septic tank 10 is necessary to provide the denitrifying bacteria with sufficient carbon necessary for cell growth. Sufficient organic matter for this purpose is not present in the recirculation tank 11.

The objective of maximizing the quality of the septic tank effluent permanently discharged from the septic tank/aerobic filter treatment assembly is accomplished by substantially preventing permanent discharge from the treatment assembly of any septic tank liquid other than in the form of filtrate from the aerobic filter 52, while compatibly returning filtrate to the septic tank 10 for denitrification to permanently remove nitrogen. This is why substantially all of the output of the pump 24 is directed to the filter 52, permitting substantially no permanent discharge of the liquid 20 in any bypassing relationship to the filter 52.

Figure 2:
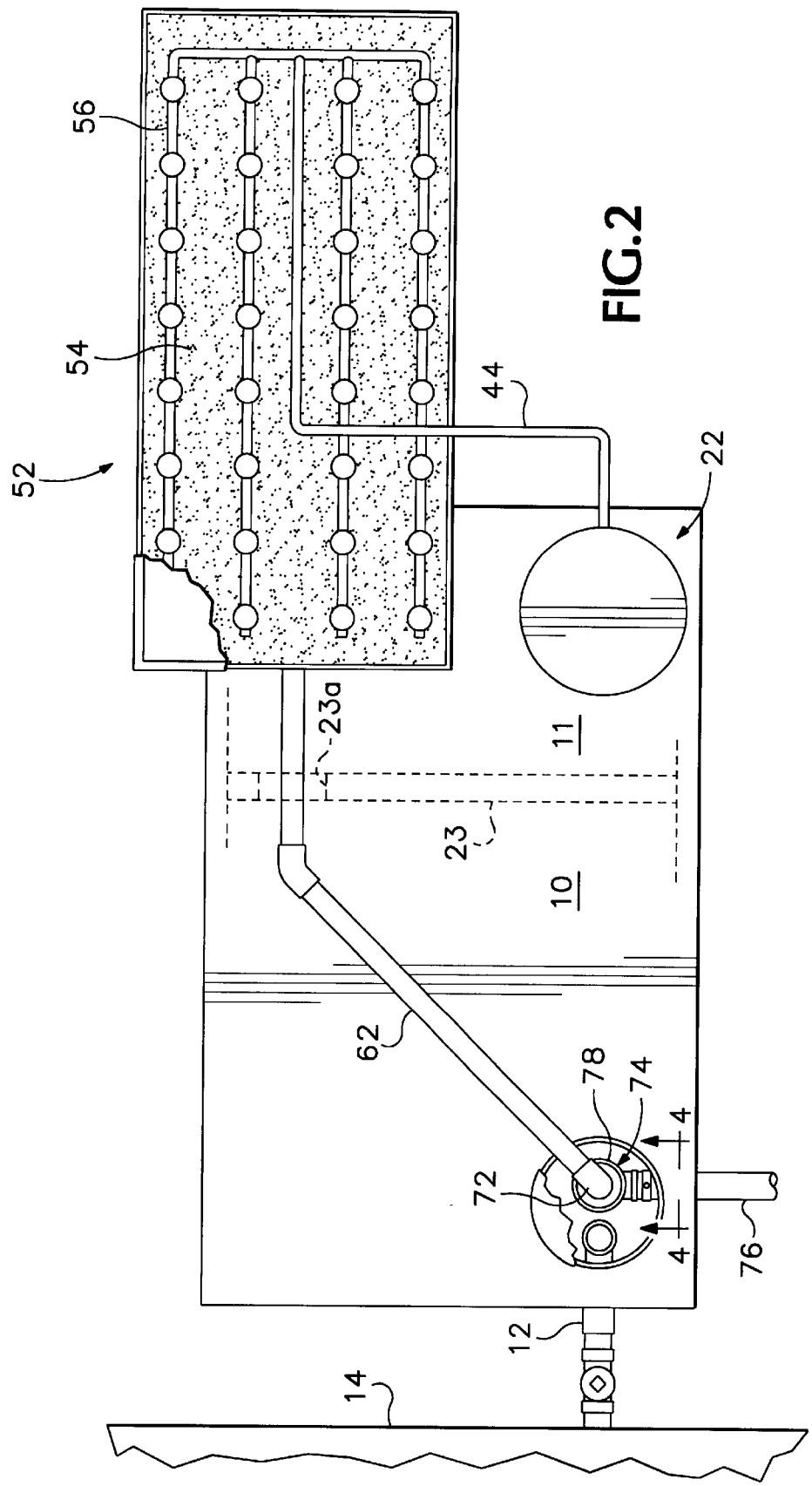
FIG. 2 is a top view of the system of FIG. 1.
Figure 3:
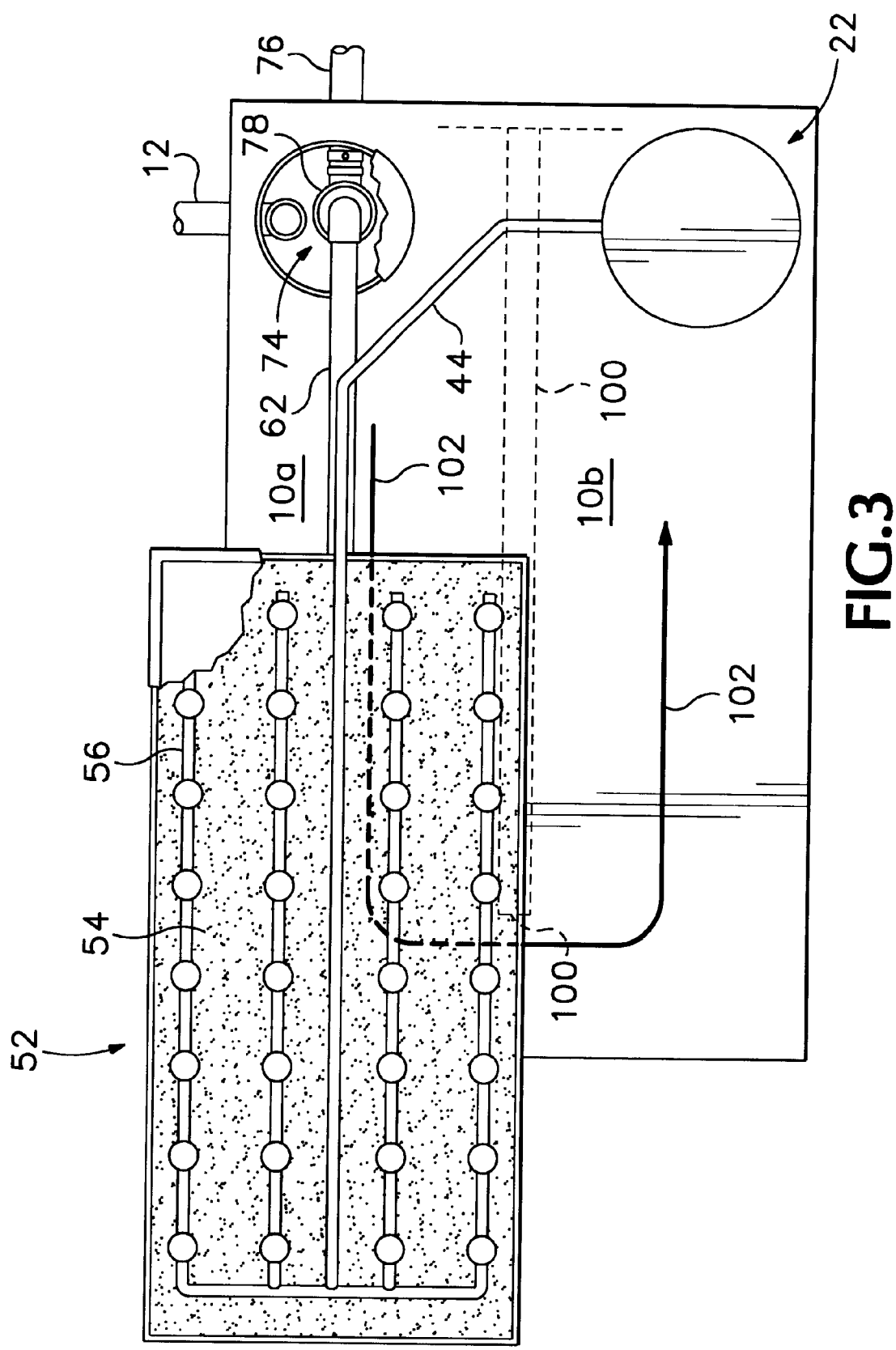
FIG. 3 is al top view of a second exemplary embodiment of a system in accordance with the present invention.

An alternative arrangement of the components of FIGS. 1–2 is shown in FIG. 3, with identical components being labeled identically. In FIG. 3 there is no recirculation tank 11, but rather a septic tank 10a which has a partition 100 only partially extending longitudinally within the tank so that, unlike FIGS. 1–2, all of the contents of the septic tank, including the sludge layer 16 and scum layer 18, exist on both sides of the partition 100. The partition 100 extends above the upper surface 21 of the liquid layer 20 and creates a conventional "meander" flowpath within the tank 10a indicated by the arrow 102 through which the liquid layer 20 flows sequentially around the opposite sides of the partition 102. When used in the past in conventional septic tanks, such meander flowpath was effective to extend the flowpath between the inlet and outlet of the tank and thereby extend the time during which solids could separate from the liquid by gravity. In the present case, however, the extended flowpath provides the additional unique function of extending the time during which denitrification of filtrate returned to the septic tank occurs, thereby maximizing gaseous nitrogen removal. This approach of maximizing denitrification by utilizing a meander-type flowpath is useful not only in the novel process described above, but also in other denitrification processes such as that described in U.S. Pat. No. 5,531,894 mentioned above.

A filtrate flow splitter or proportioning valve, indicated generally as 74, receives the filtrate from the filtrate inlet 72 and splits it into a first portion which is returned to the septic tank 10 for denitrification, and a second portion which is permanently discharged from the treatment assembly through a filtrate discharge conduit 76. The second portion can be discharged to a drain field or to any desired further treatment facility. With further reference to FIGS. 2–5, one preferred embodiment of the flow splitter 74 comprises an open-topped cylindrical housing 78 into which the filtrate 70 from the filtrate inlet 72 can flow by gravity or, alternatively, under the influence of other means such as a pump. The filtrate 70 is returned to the liquid layer 20 in the septic tank 10 preferably through one or more filtrate one-way recirculation valves 80 at the bottom of the housing 78 in parallel relation to the filtrate discharge conduit 76. A typical one-way recirculation valve 80 is formed of a flexible resilient material such as silicone with a slit 82 biased to a closed position by the resilient material of the valve other types of yieldably biased or otherwise normally closed one-way valves could alternatively be used for this purpose. The slit 82 is openable only when the depth-dependent filtrate pressure inside the valve exceeds the depth-dependent liquid pressure in the septic tank outside the valve plus the mechanical biasing force of the resilient valve material. Thus, the one-way valve 80 permits flow only in one direction, i.e., from the housing 78 to the septic tank 10, and prevents flow in the opposite direction.

When the upper surface 21 of the liquid layer 20 within the septic tank is at a level 21a as exemplified in FIG. 5, and the upper surface of the filtrate 70 in the housing 78 is at a level 70a, the pressure difference between the liquid 20 tending to close the valve 80, and the filtrate 70 tending to open the valve, is sufficient to overcome the resilient biasing force and open the valve to cause all of the filtrate 70 to be returned to the septic tank, with none of the filtrate being permanently discharged through the filtrate discharge conduit 76. This, of course, is only a temporary condition, because any addition of sewage through the inlet 12 from the residence 14 raises the level 21a thereby increasing the pressure of the liquid 20 and causing the valve either to close or at least restrict the flow of the filtrate 70 into the septic tank. This raises the level of the filtrate 70 within the housing 78 and allows at least a portion of the filtrate to be permanently discharged through the discharge conduit 76. If the upper surface of the liquid 20 in the septic tank rises to a sufficiently high level such as 21b, the valve 82 closes entirely and all of the filtrate 70 in the housing 78 is temporarily discharged through the conduit 76 until the level of the liquid 20 in the septic tank decreases. Between the levels 21a and 21b of the liquid 20, the valve 82 will have a variably restricted opening depending upon the pressure differential between the filtrate 70 and the liquid 20. However, the valve 80 could alternatively merely be of an on-off type with no variability in its opening.

An adjustable or replaceable restrictor plate 84, having a weir opening 86 or other flow-restrictive opening, is optionally provided for adjusting the size of the opening and thus the flow rate of the permanently-discharged filtrate through the discharge conduit 76.

During operation, the surface 21 of the liquid layer 20 within the septic tank will normally be somewhere between the lower, full-recirculation level 21a and the upper, full-discharge level 21b shown in FIG. 5, so that a first portion of the filtrate 70 is returned to the septic tank and a second portion of the filtrate is permanently discharged through the discharge conduit 76. The level of the filtrate 70 interior of the housing 78 is dependent upon the exterior level of the liquid layer 20 within the septic tank, the interior filtrate level rising and falling in offset relation to the rise and fall of the exterior liquid level in the septic tank. As the filtrate level rises within the housing 78, the proportion of filtrate discharged through the conduit 76 increases until it approximately reaches equilibrium with the filtrate flow rate from the inlet 72. Conversely, as the filtrate level drops in response to a drop in septic tank liquid level, the proportion of filtrate discharged diminishes until all of the filtrate is returned to the septic tank through the recirculation valve 80.

Possible alternative embodiments of the filtrate flow splitter 74 are shown in FIGS. 6–10, and are intended to be merely exemplary and not exclusive. Other alternative embodiments (not shown) could discharge the filtrate through the filtrate discharge conduit by mechanical or air-lift pump or dosing siphon, rather than by gravity, for example.

The embodiment 74a of the flow splitter shown in FIG. 6 includes the addition of a filter 88, such as a mesh screen tube filter. Filtrate from the housing 78a enters the interior of the filter tubes 90 and flows outwardly through the tubular mesh screen walls and downwardly through openings 92 toward the one-way recirculation valve 80. The filter 88 can be of any type suitable for separating solids from the filtrate returning to the septic tank.

In the embodiment 74b of FIG. 7, a flapper-type, gravity-biased, one-way recirculation valve 80a replaces the resiliently biased one-way recirculation valve 80 shown in FIGS. 6 and 7, but functions in a similar yieldably biased, normally-closed fashion.

Figure 8:
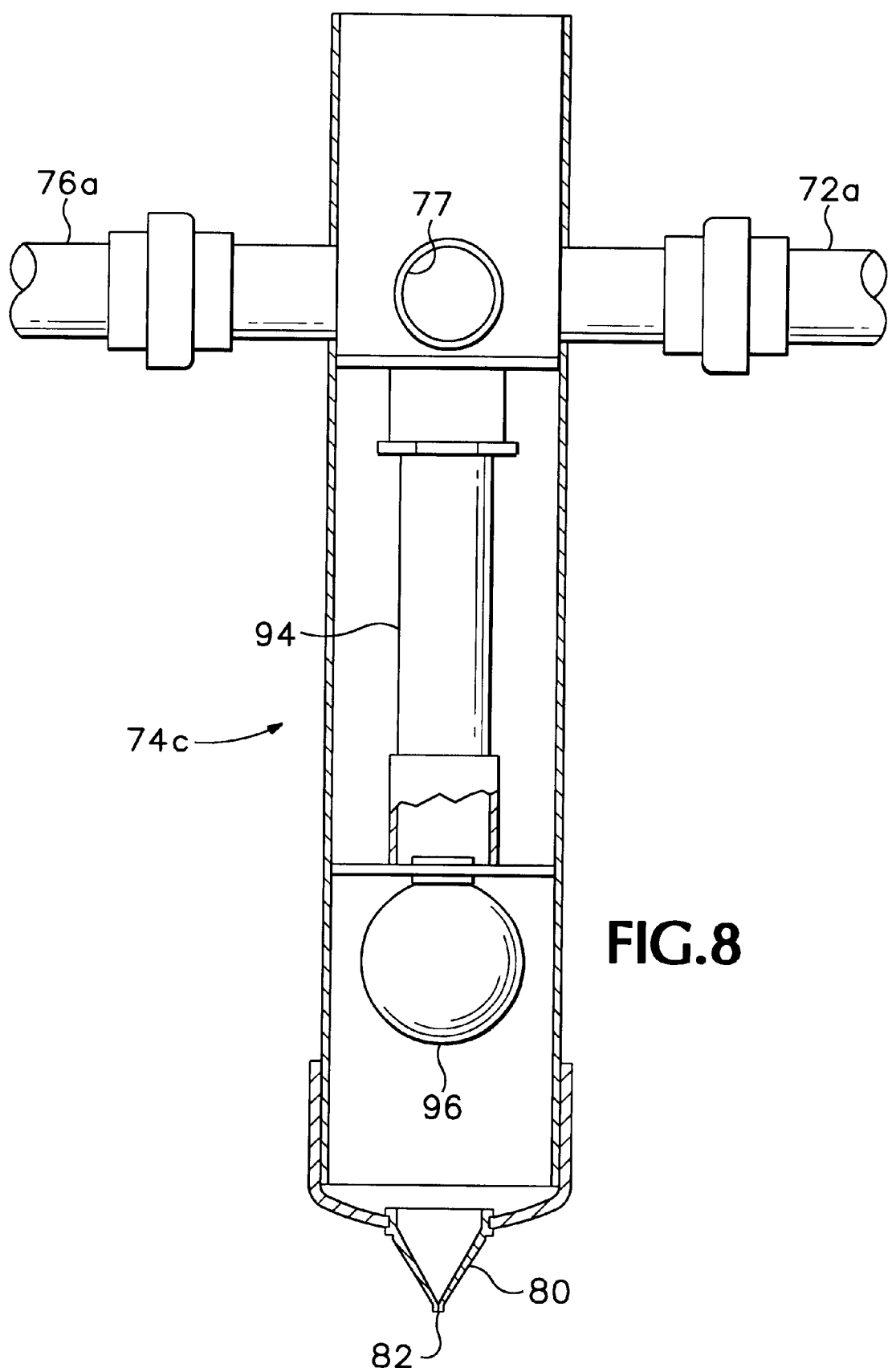
FIG. 8 is a partially sectional view of a still further alternative embodiment of a flow splitter.

The embodiment 74c of FIG. 8 receives filtrate through a filtrate inlet 72a and permanently discharges a portion of the filtrate through a filtrate discharge conduit 76a while returning another portion of the filtrate to the septic tank through a conduit 94, level-sensitive cutoff float valve 96, and one-way recirculation valve 80. Port 77 is an optional port for returning filtrate to the septic tank if the float valve 96 is closed. The float valve 96 is not redundant to the one-way recirculation valve 80. The float valve 96 is merely sensitive to fluid level, and cannot reliably prevent liquid from the septic tank from passing upwardly past the valve 96 and into the filtrate discharge conduit 76a. In contrast, the one-way recirculation valve 80 substantially prevents any passage of septic tank liquid upwardly toward the filtrate discharge conduit.

The flow splitter embodiment 74d of FIGS. 9 and 10 receives filtrate through a filtrate inlet 72b and permanently discharges a portion of the filtrate through a filtrate discharge conduit 76b surrounded by the inlet conduit 72b so as to create an inlet annulus 97 between the two conduits. A resilient seal 98 separates the annulus 97 from the discharge end of the conduit 76b. Another portion of the filtrate is returned to the septic tank through a one-way recirculation valve 80 via a conduit 100 into which the inlet conduit 72b empties. A slidably detachable coupling assembly 99a, 99b is optionally provided for quick disconnection of the flow splitter 74d from the conduits 72b and 76b. A lifting handle 104 enables easy removal of the disconnected flow splitter 74d from the septic tank. Tube 102 provides ventilation for the lower portion of the flow splitter 74d.

The exemplary alternative filtrate flow splitter embodiments 74, 74a, 74b, 74c and 74d are useful in any type of a tank or chamber where flow splitting is desired, such as a recirculation tank, and are not limited to use in a septic tank.

The terms and expressions which have been employed in the foregoing specification are used therein as terms of description and not of limitation, and there is no intention, in the use of such terms and expressions, of excluding equivalents of the features shown and described or portions thereof, it being recognized that the scope of the invention is defined and limited only by the claims which follow.

What is claimed is:

1. A method of treating sewage wastewater within a treatment assembly which comprises a septic tank and an aerobic filter having a filter medium, said method comprising:

(a) flowing substantially untreated sewage wastewater having a significant concentration of waste solids into said septic tank and allowing said solids to distribute into a lower horizontal sludge layer and an upper horizontal scum layer within said septic tank with a relatively clear horizontal layer of liquid therebetween;

(b) flowing at least a portion of said liquid from said septic tank through said aerobic filter to produce a filtrate;

(c) returning at least a portion of said filtrate from said filter to said septic tank; and (d) flowing said portion of said filtrate through said septic tank sequentially around opposite sides of at least one partition which permits communication of said waste solids between said opposite sides.

2. The method of claim 1, wherein step (c) comprises returning said filtrate to said septic tank through a one-way valve which permits liquid flow to said septic tank through said valve but prevents any liquid flow from said septic tank through said valve.

3. A method of treating sewage wastewater within a treatment assembly which comprises a septic tank and an aerobic filter having a filter medium, said method comprising:

(a) flowing substantially untreated sewage wastewater having a significant concentration of waste solids into said septic tank and allowing said solids to distribute into a lower horizontal sludge layer and an upper Horizontal scum layer within said septic tank with a relatively clear horizontal layer of liquid therebetween;

(b) flowing at least a portion of said liquid from said septic tank through said aerobic filter to produce a filtrate;

(c) returning a portion, less than all, of said filtrate from said filter to said septic tank;

(d) permanently discharging from said treatment assembly filtrate not returned to said septic tank in step (c) while substantially preventing permanent discharge from said treatment assembly of any of said liquid other than said filtrate; and (e) varying said portion of said filtrate returned to said septic tank in step (c) automatically in inverse relation to variable amounts of said liquid in said septic tank.

4. A method of treating sewage wastewater within a treatment assembly which comprises a septic tank and an (a) flowing substantially untreated sewage wastewater having a significant concentration of waste solids into said septic tank and allowing said solids to distribute into a lower horizontal sludge layer and an upper horizontal scum layer within said septic tank with a relatively clear horizontal layer of liquid therebetween;

(b) flowing at least a portion of said liquid from said septic tank through said aerobic filter to produce a filtrate;

(c) returning a portion, less than all, of said filtrate from said filter to said septic tank;

(d) permanently discharging from said treatment assembly filtrate not returned to said septic tank in step (c) while substantially preventing permanent discharge from said treatment assembly of any of said liquid other than said filtrate; and (e) at least partially performing step (c) simultaneously with step (b).

5. A method of treating sewage wastewater within a treatment assembly which comprises a septic tank and an aerobic filter having a filter medium, said method comprising:

(a) flowing substantially untreated sewage wastewater having a significant concentration of waste solids into said septic tank and allowing said solids to distribute into a lower horizontal sludge layer and an upper horizontal scum layer within said septic tank with a relatively clear horizontal layer of liquid therebetween;

(b) flowing at least a portion of said liquid from said septic tank through said aerobic filter to produce a filtrate;

(c) returning a portion, less than all, of said filtrate from said filter to said septic tank;

(d) permanently discharging from said treatment assembly filtrate not returned to said septic tank in step (c) while substantially preventing permanent discharge from said treatment assembly of any of said liquid other than said filtrate; and (e) at least partially performing step (c) simultaneously with step (d).

6. The method of any one of claims 3–5, wherein step (c) comprises returning said filtrate to said septic tank through a one-way valve which permits liquid flow to said septic tank through said valve but prevents any liquid flow from said septic tank through said valve.

7. The method of claim 6, including exposing said one-way valve to a pressure of said liquid in said septic tank tending to close said valve and to a pressure of said filtrate tending to open said valve.

8. The method of claim 7, wherein said valve is formed of flexible material, including exposing said flexible material to said pressure of said liquid tending to close said valve and to said pressure of said filtrate tending to open said valve.

9. The method of any one of claims 3–5, including flowing said portion of said filtrate through said septic tank sequentially around opposite sides of at least one partition which permits communication of said waste solids between said opposite sides.

10. The method of any one of claims 3–5, wherein step (b) includes flowing substantially all of said liquid from said septic tank through said aerobic filter to produce said filtrate.

* * * * *

UNITED STATES PATENT AND TRADEMARK OFFICE
CERTIFICATE OF CORRECTION

PATENT NO. : 6,372,137 B1
DATED : April 16, 2002
INVENTOR(S) : Terry R. Bounds

It is certified that error appears in the above-identified patent and that said Letters Patent is hereby corrected as shown below:

Column 1,
Line 56, change "(N,)" to -- ($N_2$) --.

Column 4,
Line 52, change "material of the valve other .." to -- material of the valve. Other … --

Column 7,
Line 21, change "septic tank and an" to -- septic tank and an aerobic filter having a filter medium, said method comprising: --

Signed and Sealed this

Ninth Day of September, 2003

JAMES E. ROGAN
*Director of the United States Patent and Trademark Office*